United States Patent [19]

Chiang et al.

[11] 4,386,271

[45] May 31, 1983

[54] CLOCK GENERATOR

[75] Inventors: David Chiang, Dix Hills; Mosi Chu, Setauket; Solomon Manber, Sands Point, all of N.Y.

[73] Assignee: Amtech Patent Licensing Corporation, Miami Beach, Fla.

[21] Appl. No.: 284,185

[22] Filed: Jul. 17, 1981

[51] Int. Cl.³ .............................................. G06K 9/00
[52] U.S. Cl. ..................................... 250/234; 358/208
[58] Field of Search ........................ 358/208; 347/109; 250/234

[56] References Cited

U.S. PATENT DOCUMENTS 4,032,888  6/1977  Broyles et al. ................... 358/208 X Primary Examiner—David C. Nelms
Assistant Examiner—Darwin R. Hostetter
Attorney, Agent, or Firm—Hane, Roberts, Spiecens & Cohen

[57] ABSTRACT

A clock generator for establishing working clock pulses occurring for constant increments in a scan path of a laser scanner which cyclically sweeps over a record medium at a non-constant velocity includes: a generator of a fiducial pulse at least once per cycle of sweep; a frequency synthesizer responsive to the fiducial pulses for generating radio-frequency clock pulses having a frequency greater than the fiducial pulses, and in synchronization therewith; a storage for storing a plurality of count values, each of the count values being associated with a given increment along the scan path; a working clock pulse generator, including a counter which counts the radio-frequency clock pulses, for emitting a working clock pulse each time the counter counts a count value received by the working clock pulse generator. For each working clock pulse a new count value stored in the storage is transmitted to the working clock pulse generator.

9 Claims, 2 Drawing Figures

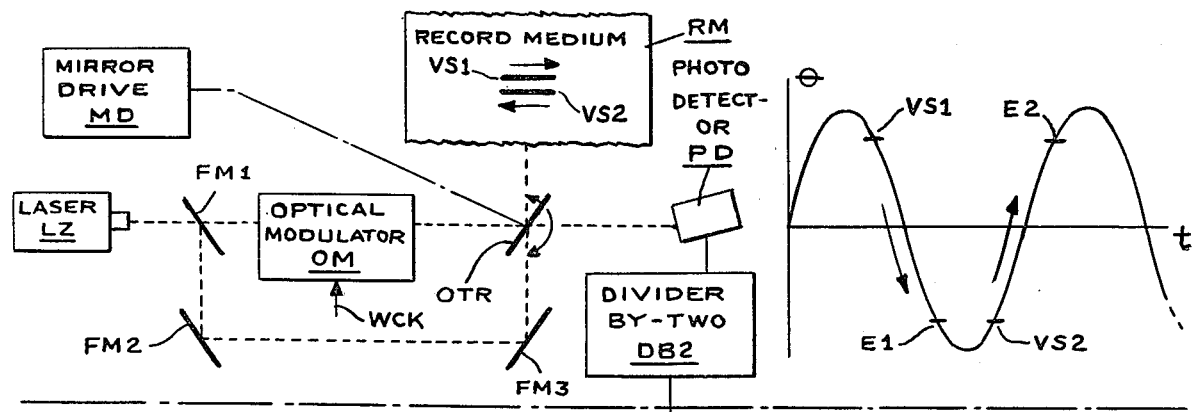
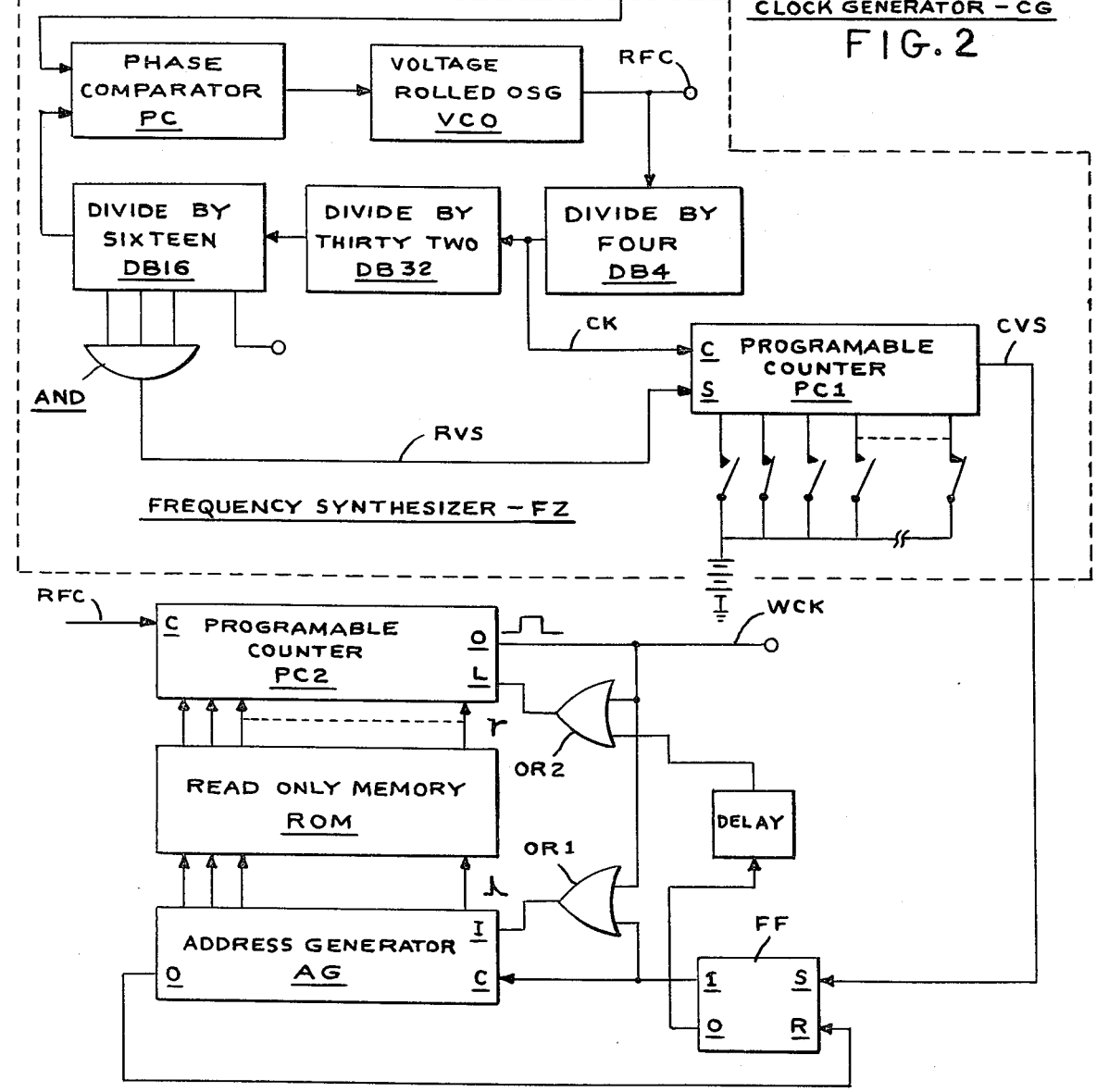
FIG. 2
FIG. 1

CLOCK GENERATOR

BACKGROUND OF THE INVENTION

This invention pertains to clock generators and, more particularly, to clock generators which are driven by a mechanically oscillating member.

In many optical scanning and recording systems, there is used a planar mirror which reciprocally rotates about an axis in its plane through a relatively small displacement angle so that a light beam fed to the mirror will trace a scan line on a record medium. For high resolution work, it is necessary to divide the scan line into constant length increments per unit time. Because of the oscillatory nature of the mirror rotation, its velocity is not linear and is, in fact, sinusoidal. Therefore, if one used a constant frequency clock to generate the pixels of the scan line, these pixels would not be uniformly spaced and distortion would be present in any image.

SUMMARY OF THE INVENTION

It is accordingly a general object of the invention to provide a clock generator which generates clock pulses which occur for constant length increments in the scan path of a variable velocity scanning device.

Briefly, the invention contemplates such a clock generator for generating working clock pulses occurring at constant length increments in the scan path of a scanner which cyclically sweeps over a record medium at a nonconstant velocity. The generator includes means for generating a fiducial pulse at least once per cycle of sweep. A frequency synthesizer means is responsive to the fiducial pulses for generating radio frequency clock pulses. The radio frequency clock pulses have a frequency greater than the frequency of the fiducial pulses and are in syncronization with these pulses. There is further provided storage means for storing a plurality of count values. Each of these count values is associated with a given length increment along the scan path. A working clock pulse generating means includes a counter means for counting the radio frequency clock pulses and emits a working clock pulse each time the counter means has counted a count value received by the working clock pulse generator means. Finally means responsive to the working clock pulse sequentially transmit the count values stored in the storage means to the working clock pulse generator means.

It should be noted that if all the count values are the same, then the working clock pulses would occur at a constant frequency. However, by making the count values functions of the sinusoidal velocity, then it is seen that the working clock pulses will occur at a frequency proportional to a sinusoid and therefore at constant length increments of sweep of the scanner.

BRIEF DESCRIPTION OF THE DRAWINGS

Other objects, the features and advantages of the invention will be apparent from the following detailed description when read in conjunction with the accompanying drawing which shows the presently preferred embodiment of the invention.

In the drawing:

FIG. 1 is a block diagram of a laser scanning system incorporating the invention; and FIG. 2 is a waveform showing the angular displacement of an oscillating mirror about a home position as a function of time.

DESCRIPTION OF THE PREFERRED EMBODIMENT OF THE INVENTION

In FIG. 1 there is shown the laser scanning system LSS which includes a clock generator CG for controlling the operation of the system. When the system is in a writing mode, the laser LZ projects a beam of light via the optical modulator OM to the oscillating torsion rod mirror OTR from whence it is deflected to the record medium RM. The oscillating torsion rod OTR is a conventional device which, when a voltage is applied to mirror drive MD, will oscillate about a rest position. Typically, the amplitude of the oscillations is in the order of three degrees. Thus, if the record medium RM moves in a vertical direction, a series of parallel lines can be traced by a continuously operating laser LZ. However, under normal circumstances, the optical modulator OM is controlled to block and pass the light beam in a pattern controlled by a character generator, not shown. In this way, dot patterns can be made to form graphic patterns. While the system as shown concerns the recording of characters on a record medium, it is equally possible to use the system to scan characters previously recorded on the record medium. In this case, the laser would be continuously on and scanning in the same manner as for writing. However, the system would further include a photo-electric means aimed at the scanning path to pick up reflections therefrom. Furthermore, the relative positions of the record medium, the mirror and the laser are purely representative. In addition, the movement of the record medium to permit the generation of parallel lines is merely by way of example. It is also possible to use a fixed record medium and carry the laser-modulator-torsion rod mirror system on a carriage and move this carriage with respect to the record medium. In any event, the recording and scanning parts of the system do not concern the present invention. The present invention is concerned with the generation of the working clock pulses fed on the line WCK to the optical modulator OM to insure that any dot patterns that are recorded are uniformly spaced along a scan line.

To accomplish this, the clock generator GC is employed, along with a second optical path. In particular, the beam from the laser is reflected off half-silvered mirror FM1 to mirror FM2 and from there via mirror FM3 to the reverse side of the oscillating torsion rod mirror OTR. The light beam is then reflected off this reverse side and actually sweeps out an arc of approximately 3°. Somewhere along that portion of the arc is positioned a photo detector PD. The photo detector PD is aimed at an intermediate point in the arc and not at the end points. Thus, during each cycle of oscillation the photo detector PD picks up two light pulses. These light pulses are fed to divide-by-two counter DB2 so that one (fiducial) pulse occurs for each complete cycle of oscillation of the galvanometer mirror OGM. In response thereto, the frequency synthesizer FZ generates radio-frequency clock pulses which has a frequency much higher than the frequency of the fiducial pulses. In fact, the multiplication factor in frequency can be in the order of two to the eleventh power. The radio frequency clock pulses are emitted on the line RFC. In addition, the frequency synthesizer FZ emits on line CVS two start of sweep pulses per cycle of oscillation of the galvanometer mirror. These two sweep pulses are precisely 180° apart in the oscillatory pattern of the mirror. As can be seen in FIG. 2, the oscillatory pattern is a sinesoid swinging about a rest or center position. The two start of scan pulses are picked so that they occur somewhat after a change in direction of the movement of the mirror. Shown in FIG. 2, one of these pulses occurs at point VS1 and the other at point VS2. Preferably, these pulses are picked to occur at about from 15° to 20° from the end points of the travel so that the highly non-linear portions of the oscillation are not used. (The gross location of these points is established by the photodetector PD.) In any event, each pulse on line CVS sets the flipflop FF which opens the address generator AG1. (It should be noted at this time the address generator AG1 is at address 0.) In addition, the setting of the flipflop FF causes a positive going transient to pass through the OR-circuit OR and increment the address generator to the first address. The address is fed to the read-only memory ROM.

In the read-only memory ROM in sequential addresses are stored count values. These count values are obtained by dividing the angular displacement between the point VS1 and E1 in the oscillation into an equal number of angles and thereafter determining the sine value for each one of those angles and then, finally, subtracting adjacent sine values to obtain a difference number. These difference numbers are multiplied by a constant related to the frequency of the radio frequency clock pulses. This final set of numbers determines the count values that are stored in the read-only memory ROM. Thus, for address 1, there is stored the count value between the start of the scan and the first delta theta point. This count value is read from the read-only memory into the programmable down counter PC2. The down counter starts unit decrementing by the receipt of the radio frequency clock pulses on the line RFC. When the down counter reaches an underflow, a pulse is emitted from its output 0 onto the line WCK. This pulse is a working clock pulse. In addition, that pulse is fed through the OR-circuit OR to increment the address generator to address 2. The trailing edge of the pulse on line WCK causes a triggering of the L-input of the programmable counter PC2 and the next value is loaded into the counter. Finally, when the address for the last count value occurs, the address generator AG is driven to overflow. At that time, the pulse from the 0-output resets the flipflop FF and awaits the next start scan pulse on line CVS.

The frequency synthesizer FZ comprises a conventional phase-locked loop consisting of the phase comparator PC having one input connected to receive the fiducial pulses from the divide-by-two DB2. The output of the phase comparator PC is fed to a high-frequency voltage controlled oscillator VCO which generates the radio frequency clock pulses on line RFC. These clock pulses are divided down to the frequency of the fiducial pulses. The dividing is performed by a cascaded divided chain comprising, by way of example, divide-by-four DB4 (which if the frequencies are sufficiently high, must be an emitter-coupled logic device), the divided-by-thirty two DB32 and the divide-by-sixteen DB16 whose output is fed to the other input of the phase comparator PC for comparison with the fiducial pulses.

Under normal circumstances, a tap in the divider chain could be used to generate the start of scan pulses. However, because of mechanical uncertainty in positioning the photodetector PD and the tolerances in the electrical components in the phase-locked loop, it may be necessary to controllably vary the occurrence of the start of scan, i.e., the point VS1 in FIG. 2. In order to provide the facility to vary the start of this point, there is included in th system the programmable counter RC1. The inputs to this counter are an array of parallel switches which, in effect, introduce a coded number or count value into the counter. The counting is performed by pulses on line CK from the divide-by-four DB4. The counter is controlled to operate when particular counts are registered in the divide-by-sixteen DB16. (The three most significant bits therein) This particular count is sensed by the AND-circuit AND which is fed via the line RVS to the load input of the counter PC1. If even further precise control of this start point is needed, one can introduce delay multivibrators in the line CVS with the timing of the multivibrators controlled by a variable potentiometer in their timing circuits.

While only one embodiment of the invention has been shown and described in detail, it will now be obvious to those skilled in the art many modifications and variations satisfying many or all of the objects of the invention without departing from the spirit thereof. For example, instead of using the programmable down counter PC, one could equally well use a regular up-counter and feed the output of this up-counter into one side of a parallel comparator whose other side receives count values from the read-only memory ROM so that when the equalities occur, the output of the comparator generates the pulses on line WCK which are used to select the next count value from the memory.

What is claimed is:

1. A clock generator for establishing working clock pulses occurring for constant increments in a scan path of a scanner which cyclically sweeps over a record medium at a non-constant velocity, said generator comprising means for generating a fiducial pulse at least once per cycle of sweep, frequency synthesizer means responsive to the fiducial pulses for generating radio-frequency clock pulses having a frequency greater than the fiducial pulses, and in synchronization therewith, storage means for storing a plurality of count values, each of said count values being associated with a given increment along the scan path, working clock pulse generator means, including counter means for counting the radio-frequency clock pulses, for emitting a working clock pulse each time the counter means has counted a count value received by the working clock pulse generator means, and means responsive to the working clock pulses for sequentially transmitting the count values stored in said storage means to said working clock pulse generator means.

2. The apparatus of claim 1 wherein said working clock pulse generator means includes a programmable down counter which is decremented for each received radio-frequency clock pulse, which emits a working clock pulse when decremented to a given value, and which is programmed with a count value from said storage means in response to the occurrence of a working clock pulse.

3. The apparatus of claims 1 or 2 wherein the scanner comprises a reciprocally rotating mirror and a laser beam means directed toward said mirror and said means for generating the fiducial pulses includes a photoelectric means.

4. The apparatus of claim 3 wherein said photoelectric means comprises a photoelectric device for emitting a pulse signal each time the laser beam impinges thereon and means connected to said photoelectric device for emitting a fiducial pulse for each two pulse signals emitted by said photoelectric device.

5. The apparatus of claim 1 wherein said frequency synthesizer means includes means for emitting a start of scan signal for each of the fiducial pulses and said storage means includes a memory having a plurality of addressed storage locations for storing the count values and a recycable address generator means for sequentially generating the addresses of the storage locations in response to the working clock pulses, each of the start of scan signals initiating a new cycle of said address generator means.

6. The apparatus to claim 5 wherein said synthesizer means further includes means for controllably varying the time of occurrence of the start of scan signal during cycle of the scanner.

7. The apparatus of claim 3 wherein said frequency synthesizer means includes means for emitting a start of scan signal for each of the fiducial pulses and said storage means includes a memory having a plurality of addressed storage locations for storing the count values and a recyclable address generator means for sequentially generating the addresses of the storage locations in response to the working clock pulses, each of the start of scan signals initiating a new cycle of said address generator means.

8. The apparatus of claim 7 wherein said synthesizer means further includes means for controllably varying the time of occurrence of the start of the scan signal during cycle of the scanner.

9. The apparatus of claim 8 wherein said means for controllably varying the time of occurrence of the start of the scan signal includes a presettable pulse counter for counting pulses derived from the radio-frequency clock pulses.

* * * * *